June 11, 1935. D. F. NEWMAN 2,004,583
SOUND REPRODUCING SYSTEM
Filed Jan. 14, 1931 2 Sheets-Sheet 1
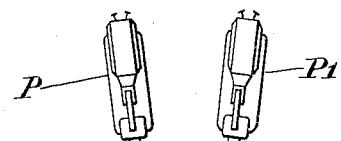
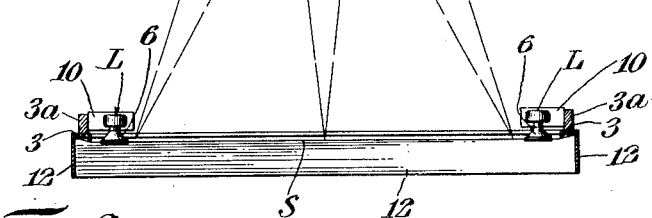
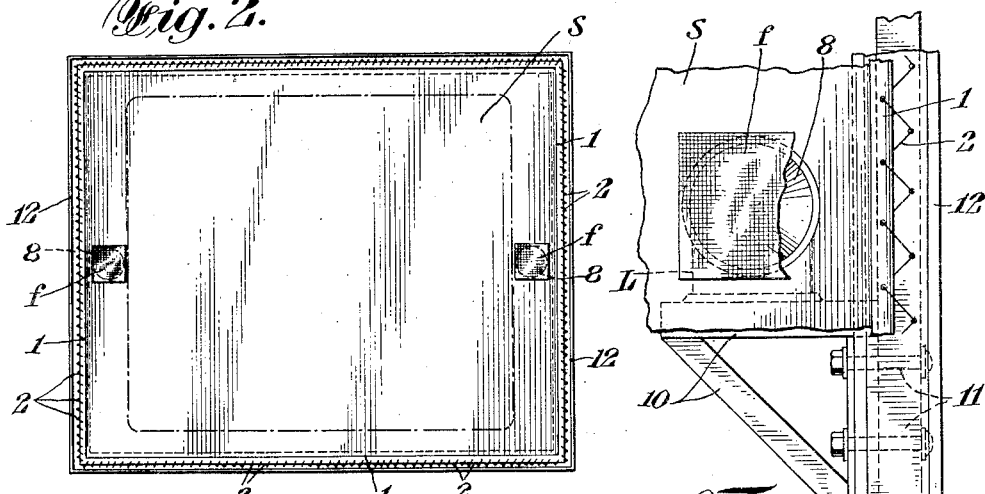
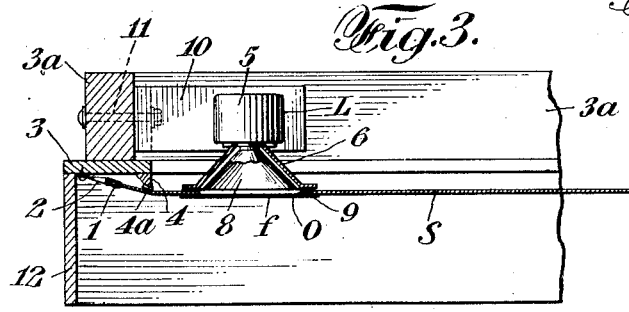
INVENTOR
David F. Newman
BY
Ward, Crosby & Neal
ATTORNEYS

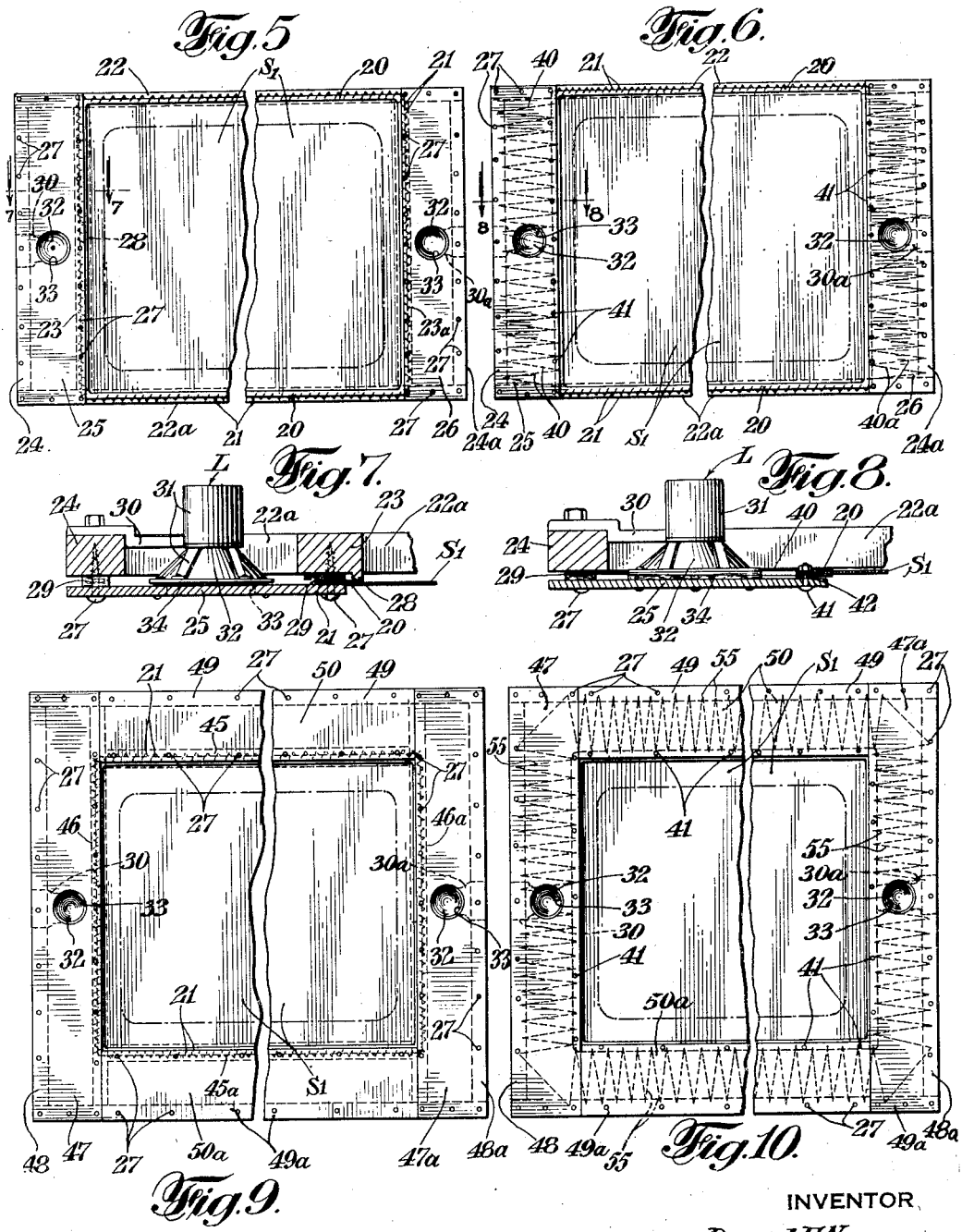

Patented June 11, 1935

2,004,583

UNITED STATES PATENT OFFICE 2,004,583

SOUND REPRODUCING SYSTEM

David F. Newman, Freeport, N. Y., assignor to Trans-Lux Daylight Picture Screen Corporation, New York, N. Y., a corporation of Delaware Application January 14, 1931, Serial No. 508,669

5 Claims. (Cl. 88—16.2)

My invention relates to a combined or dual function system for the display of images, representations, or the like, and for the reproduction of sound.

In accordance with my invention, there is produced a combined system of the character stated which operates in a novel and highly satisfactory manner for projection and sound reproduction purposes.

Further objects, characteristics and advantages of my invention will become apparent from the following description taken in connection with the accompanying drawings.

My invention resides in the combined system, features and arrangements of the character hereinafter described and claimed.

For an understanding of my invention and for an illustration of some of the many forms thereof, reference is to be had to the accompanying drawings, in which:

Figure 1 is a diagrammatic view, partly in horizontal section, of a combined system as constructed in accordance with my invention;

Fig. 2 is a front elevational view of apparatus shown in the system of Fig. 1;

Fig. 3 is an enlarged, horizontal sectional view, partly in plan, of apparatus shown in the system of Fig. 1;

Fig. 4 is an enlarged, fragmentary elevational view of apparatus shown in the system of Fig. 1;

Fig. 5 is a front elevational view illustrating another form of my invention;

Fig. 6 is a front elevational view illustrating still another form of my invention;

Fig. 7 is a transverse, horizontal sectional view, partly in plan, and is taken on the line 7—7 of Fig. 5 looking in the direction of the arrows;

Fig. 8 is a transverse, horizontal sectional view, partly in plan, and is taken on the line 8—8 of Fig. 6 looking in the direction of the arrows;

Fig. 9 is a front elevational view illustrating still another form of my invention; and Fig. 10 is a front elevational view illustrating still another form of my invention.

An important application of my invention relates to its use in the talking or sound motion picture field and, for purposes of explanation, the invention will be illustrated and described in connection with such an application.

The operation of the ordinary commercial talking motion picture system is well understood in the art. In such a system, the projection apparatus is disposed on the same side of the screen as that occupied by the audience while the sound reproducing apparatus occupies space at the side of the screen removed from the audience. The projecting light beam carrying the image comes to the audience because reflected by the screen while the sound waves, to great extent, pass through the screen-forming material in order to reach the audience. Since the sound reproducing apparatus is positioned behind the screen, there is an illusion, more or less satisfactory, that the sound comes from the images appearing on the screen.

In accordance with my invention, the projection apparatus may be positioned at the side of the screen removed from the audience, the projecting light beam passing through the screen in order to reach the eyes of the audience. In other words, with my invention, "rear projection" is practiced, ordinarily, and not "front projection." Because the projection apparatus is thus positioned to the rear of the screen, it results that the sound reproduction may not be effected as in prior practice since, if it were, the reproducing apparatus would be in the path of the projecting light beam and the shadow thereof would appear on the screen.

Referring now to Fig. 1, P and P1 represent a pair of projector mechanisms of any suitable type such, for example, as are ordinarily utilized for commercial front projection, said projectors being focused upon the rear of the screen structure S.

The screen structure S is of flexible, sheet-like configuration, translucent to a desired degree, and it may be formed from body material, a light-diffusing agent, a light-filtering agent, and an agent having germicidal, bacteriacidal, fungicidal, and/or preservative qualities. Ordinarily, these substances are brought to a viscous condition in any suitable manner and, while suitably elevated in temperature, are molded on a suitable table. While the use of the specified screen-forming material and agents is desirable, it shall be understood that some of them may be omitted if desired and further it shall be understood that other agents such, for example, as a curing agent may be utilized as desired.

As herein shown, the completed screen structure, immediately adjacent the periphery thereof, has or comprises spaced areas or sections O which preferably are much less sound obstructing or are much more transparent to sound waves than the image area of said screen structure.

In accordance with my invention, the edges of the screen structure S may be bound by eyeletted canvas strips 1 or the like adhesively or otherwise suitably secured to marginal edges thereof. Threaded to the strips 1 is a lacing 2 which is suitably secured to a frame 3 substantially rectangular in correspondence with the configuration of the screen structure S and disposed substantially vertically between the projectors P, P1 and the audience. The lacing 2 retains the screen structure S in the frame 3 under more or less tension. Peripherally, the screen structure S just inside the binding 1, bears upon or engages the rib structure 4 formed by members which are attached to and extend along the inside edge of each of the members forming the frame 3, said rib structure 4 preferably carrying a layer of felt 4a or equivalent with which the screen structure S engages to reduce the possibility of transmitting vibrations thereto from the frame.

The aforesaid spaced areas or sections O may be unobstructed passages or openings formed in any suitable manner in the screen structure S. Preferably, however, such openings or passages are spanned or covered, by fabric sections f adhesively secured to one surface of said screen structure. These fabric sections f may be of any suitable character that will permit the desired or maximum passage of sound waves therethrough. The presence of these adhered fabric sections is desirable because preventing or impeding objectionable or undesired deformation or distortion of the screen structure S, elongation of the aforesaid openings or passages, or curling of the material immediately adjacent thereto. It has been demonstrated that georgette crepe serves admirably for the purpose stated although any other suitable material may be utilized.

In accordance with my invention, a suitable loud speaking unit L is disposed to the rear of each of the areas or sections O whereby sound waves pass through said areas or sections to the audience on the other side of the screen structure S. These loud speaking units L may be of any desired and suitable type although preferably they are of the electro-dynamic type. As herein generally shown, each unit L comprises a casing 5 housing the electro-magnetic mechanism, said casing 5 carrying rigid therewith a frame 6 within which is disposed a diaphragm 8 preferably of the conical type.

Preferably, each area or section O is circular and corresponds substantially in size with that defined by the large end of the adjacent diaphragm 8. With a unit L positioned as just stated, the flanged end of the frame 6 of that unit may be placed in intimate contact with the screen structure S. However, preferably and as shown, it is desirable that a ring or annulus 9 of felt or similar material shall snugly and tightly fit between said flanged end of the frame 6 and the adjacent section of the screen structure S.

The diaphragm 8, as it vibrates, sets air in motion by its front surface and also by its rear surface. In other words, both surfaces of said diaphragm produce sound waves. By virtue of the arrangement described above, the sound waves produced by said front diaphragm surface pass through the alined screen section O along a substantially sealed path and, therefore, there is little, if any, leakage thereof at the rear of the screen. The sound waves produced by the rear surface of the diaphragm pass freely through the apertures of the frame 6 and these last named sound waves may be reduced in volume by absorption thereof by suitable material disposed around the rear of the diaphragm or they may be otherwise muffled in any suitable manner. The use of the felt ring or the like is desirable due to the fact that a sealed path of high efficiency is obtained therewith, the felt ring presenting a soft surface to the screen structure whereby possible rattle of the latter is prevented, said felt ring further being desirable because a surface is thereby presented to said screen structure which readily takes any configuration imposed by the latter.

The loud speaking units L may be mounted in any desired manner in proper operative positions to the rear of the screen structure S. As herein shown, although not necessarily, each section of the frame 3 carries a reinforcing member 3a and each of the vertically extending members 3a has a bracket 10 suitably secured thereto, as by bolts 11. As shown, these brackets face toward each other and are arranged at suitable height with respect to the respective areas or sections O whereby each unit L may be supported as shown with its diaphragm in alinement with the adjacent area or section O. In lieu of the arrangement just described, the brackets 10 or the like may be suitably secured to the vertical parts of the frame 3 or to horizontal frame sections when the areas O are near the top or bottom of the screen structure S.

The loud speaker units L may be connected in any desired parallel or series circuit relation and they may be actuated by current derived from any suitable source for transmitting the record or characteristic, for example, of a disk or of a motion picture film sound track traversing one of the projector mechanisms. This current may be amplified in any suitable manner to cause the production of sound waves of a desired character by the loud speaking units L.

Usually, the display on the screen structure S is similar to that in ordinary, commercial sound motion pictures. Thus, the characters may represent actors in a drama, a musical production or the like. Or, for example, the action may represent events which have recently happened such as "news pictures". In any event, as will be well understood, the sound waves issuing from the loud speaking units L should be synchronized with the action represented on the screen structure S. There should be the illusion, to a person seated anywhere in the auditorium, that the sounds reproduced come from the actor or appropriate portions of the scene represented.

A synchronized system of this character as constructed or arranged in accordance with my invention is highly satisfactory in operation. The sound waves, although proceeding from a plurality of distinct sources, reach the audience in such a way that the locations of these sources are not recognized. The system is largely or substantially non-directional since there appears to be a single source of sound at the screen structure S and the illusion is substantially perfect that such sound emanates from whatever sound source is represented by the corresponding image on the screen. Obviously, this sound source might appear to be in any part of the visible screen area.

The reasons for this non-directional sound characteristic of the system of my invention are not clearly apparent to me. As stated, the central area of the screen structure S serves for the display of images and the sound wave beams pass transversely of the image area and adjacent the sides thereof. Whatever the reason, it seems to be clear that an arrangement of this character is advantageous from the non-directional viewpoint.

Further, in so far as is known, it has not heretofore been proposed to use in a sound reproducing system a projection screen as described herein. Projection screens described as adapted for rear projection are translucent and the body material of the screen structure causes it to be of such character that sound waves do not pass readily therethrough. This is in marked contrast to the type of screen utilized ordinarily in commercial front projection systems wherein the screen is of such porous character that the sound waves pass readily through the image area thereof. With my invention, the image area of the screen structure and more particularly the entire area thereof save the sections O is preferably largely opaque to sound waves. Because of this condition, it is believed that the screen structure of my invention functions as a baffle in a highly efficient manner whereby the system has the desirable non-directional characteristic noted above. In connection with the above described baffle action, it is to be noted that the screen structure of the character herein described, ordinarily, is flexible while still having the characteristic of being largely opaque to sound waves. To an undetermined extent, this flexible character of the screen structure is believed to be important in connection with the baffle action thereof.

Under some circumstances, it may be desirable to dispose members 12 along all sides of the screen structure S, these members extending toward the audience substantially from the plane of said structure and being arranged preferably substantially at right angles with respect thereto, although this angle may be advantageously varied to suit circumstances or certain conditions. As will be obvious, these members 12, to much greater extent than without them, confine the propagated sound waves to the auditorium area since they influence the direction of the sound waves. Due to the provision of these members 12, the volume of sound delivered to the auditorium is favorably modified.

Ordinarily, the screen structure S comprises a plurality of the spaced areas of sections O, these being located as desired. However, under some circumstances, it may be desirable to provide or use but a single loud speaking unit, in which case, a single sound beam passes through a single area O of the screen structure. Even with an arrangement of the character last described, for some reason or other, probably the above described baffle action of the screen structure S, it results that the system is substantially or largely non-directional.

Any suitable arrangement, not shown, may be employed to mask the periphery of the screen structure S so that the lacings 2 and fabric sections f are not visible to the audience. In other words, the visible screen area may be as indicated by dash-and-dot sections of Fig. 2.

Although my invention is not particularly concerned with the number of projector mechanisms which may be employed, in present practice at least two of such mechanisms are required if there is to be continuity of action on the screen structure. As shown, the two projector mechanisms are displaced laterally from the line normal to the center of the screen. With such an arrangement, the optical systems of the projector mechanisms should be suitably corrected by any suitable means so as to obtain correct focus and lack of objectionable keystone effect of the projected images.

Preferably, the projection or objective lens arrangements of the projector mechanisms P and P1 are wide-angle lens combinations of the character described and claimed in U. S. Letters Patent No. 1,863,099. With such wide-angle lens combinations, the distance between screen and projector is much less than is necessary with an ordinary projection lens. Accordingly, rear projection is rendered practical in the limited space usually existing on the stage of an ordinary theatre. Rear projection is desirable for many reasons such, for example, as the removal of the fire hazard from the audience area, increased theatre illumination during the performance, etc., etc.

With the form of my invention hereinbefore described, the screen structure itself is provided with the sections or areas O which, as stated, are largely transparent to sound waves. It shall be understood, however, that my invention it not to be thus limited since other generally equivalent arrangements may be utilized in a satisfactory manner.

Thus, referring to Figs. 5 and 7, there is shown a screen structure S1 which may be and preferably is of the composition hereinbefore described in connection with the screen structure S but which does not include areas substantially transparent to sound waves. As with said screen structure S, it is desirable that the edges of the screen structure S1 be bound by eyeletted canvas strips 20 or the like adhesively or otherwise suitably secured thereto. Threaded to the binding strips 20 is a lacing 21 which is suitably secured to a frame herein shown as comprising the top and bottom members 22, 22a and the side members 23, 23a. By the lacing 21, the screen structure S1 is held in the aforesaid frame under any suitable degree of tension and, ordinarily, substantially the entire area thereof is used for exhibition purposes, the lacing arrangement, however, being suitably masked.

In accordance with the form of my invention shown in Fig. 5, the upper and lower frame members 22 and 22a extend beyond the side frame members 23 and 23a, said upper and lower frame members 22 and 22a being joined at one end by a frame member 24 and at the other end by a frame member 24a.

Secured to the frame members 23 and 24 is a plate or member 25 and likewise secured to the frame members 23a and 24a is a plate or member 26. The members 25 and 26 may thus be secured in position in any suitable manner but preferably there is utilized an arrangement as shown herein where screws 27 or the like are passed through said members 25 and 26, the screws being threaded to the adjacent frame members.

The frame members 22, 22a, 23 and 23a preferably carry felt-faced rib structure 28 similar in function to the above described rib structure 4 and its felt covering 4a. By the rib structure 28, the plane of the screen structure S1 is displaced somewhat beyond the adjacent frame face, Fig. 7, the latter also showing the manner in which the binding strips 20 and the lacings 21 are disposed in front of the respective fame members 23 and 23a. Therefore, in order that there may be space for this lacing arrangement, the members 25 and 26 should be slightly spaced from the adjacent frame members and, with the form of my invention herein disclosed, this result is obtained by providing washers 29 of felt or the like positioned as shown, a screw 27 passing through each of the washers 29.

Thus, in the arrangement described above, the screen structure S1 is provided with a plate 25 at one side thereof and a plate 26 at the other side thereof and, as shown, said screen structure and plates are disposed substantially in the same vertical plane. Preferably, the opposite sides of the screen structure S1 are in close engagement with the respective adjacent surfaces of the plates 25 and 26 and, therefore, a practically unbroken surface comprising the plate 25, screen structure S1 and plate 26 faces the auditorium area.

By my invention as shown in Figs. 5 and 7, sound waves are passed, not through the screen structure S1, but through the plates 25 and 26. To this end, the arrangement may be such as is suitable or desired, a preferred construction involving brackets 30, 30a which are suitably secured preferably to the respective frame members 24, 24a so that they extend toward each other and preferably these brackets are disposed substantially at the same level. To each of these brackets there is suitably secured the frame 31 of a suitable loud speaking unit L which preferably comprises the usual conical diaphragm 32. In alinement with each of the loud speaking diaphragms 32, the respective plates 25 and 26 are provided with openings 33 of substantially the same diameter as that of the adjacent diaphragm. Preferably, washers 34 of felt or the like are interposed between the respective rear faces of the members 25 and 26 and the adjacent front surfaces of the frames of the loud speaking units L whereby substantially sealed paths are provided through the respective members 25 and 26 for sound waves set up by the front surfaces of the respective loud speaker diaphragms.

The form of my invention shown in Figs. 6 and 8 does not differ greatly from that described in connection with Figs. 5 and 7. The principal difference involves the omission, in Figs. 6 and 8, of the frame members 23 and 23a, Figs. 6 and 8, then, involving a frame construction comprising the same upper and lower frame members 22 and 22a and the extreme side frame members 24 and 24a.

With such an arrangement, the screen structure S1 may be secured to the upper and lower frame members 22 and 22a substantially the same as described in connection with Figs. 5 and 7. However, due to the omission of the frame members 23 and 23a, opposite sides of the screen structure S1 of Figs. 6 and 8 are secured to the respective side frame members 24 and 24a by lacings 40 and 40a.

Further, due to the omission in Figs. 6 and 8 of the frame members 23 and 23a, the respective inner edges of the plates 25 and 26 are secured preferably to those binding strips 20 carried by the adjacent screen structure edges. Any suitable arrangement may thus be utilized such, for example, as herein shown where a plurality of bolts 41 extend through the respective plates 25 and 26 of Fig. 6 and the respective binding strips 20. Preferably, each of said plates are spaced from the respective frame members 24, 24a and the adjacent screen edges by felt washers 29 and 42, or the like.

Referring to the form of my invention illustrated in Fig. 9, the arrangement is somewhat the same as heretofore described in connection with Figs. 5 and 7. That is, the screen structure S1 is bounded on all sides by a frame comprising the upper and lower members 45, 45a, and the side members 46, 46a. As will be obvious, these frame members correspond generally with the corresponding frame members of Fig. 5.

In connection with Figs. 5 and 7, it will be noted that the screen structure S1 is bounded by the plates 25 and 26 only at the respective sides thereof. This arrangement is followed in Fig. 9 wherein the plate 47 corresponds with the plate 25 and is secured to the frame member 46 and a frame member 48 spaced therebeyond and corresponding with the aforesaid frame member 24. In a similar manner, the plate 47a, corresponding with the hereinbefore described plate 26, is secured to the frame member 46a and another frame member 48a spaced therebeyond and corresponding with the aforesaid frame 24a.

As will clearly appear, the frame members 46, 46a, 48 and 48a extend both above and below the screen structure S1, the upper ends of these frame members being joined by a frame member 49 and the lower ends of said frame members being joined by a frame member 49a. These upper and lower frame members 49 and 49a are utilized in conjunction with the respective frame members 45 and 45a for securing in position upper and lower plates 50 and 50a whereby the screen structure S1 of Fig. 9 is bounded on all sides by plates disposed substantially in the plane thereof.

The form of my invention shown in Fig. 10 embodies certain characteristics of both Figs. 6 and 9. The frame construction of Fig. 10 omits the members 45, 45a, 46 and 46a of Fig. 9 and, therefore, comprises only the outer frame members 48, 48a, 49 and 49a of Fig. 9. To each of these last named frame members, the adjacent edges of the screen structure S1 of Fig. 10 are secured by lacings 55 which correspond in structure and function with the lacings 40, 40a hereinbefore described in connection with Fig. 6. Further, the arrangement of Fig. 10 includes side plates 47, 47a, a top plate 50 and a bottom plate 50a, thereby following Fig. 9 in this respect. For securing the various top, bottom and side plates of Fig. 10 to the respective top, bottom and side edges of the screen structure, a construction such as the bolt construction 41 of Figs. 6 and 8 may be utilized.

It will be understood that the various loud speaking units illustrated in Figs. 6, 8, 9 and 10 may be supported the same as hereinbefore described in connection with Figs. 5 and 7 and that the plates 25, 26 of Figs. 6 and 8, and the plates 47, 47a of Figs. 9 and 10 may be apertured the same as the plates 25 and 26 of Figs. 5 and 7 for the passage of sound waves therethrough. Further, if desired, the plates 50, 50a of Figs. 9 and 10 may be apertured and have loud speaking units associated therewith for the passage of sound waves through the respective apertures.

The various plates 25, 26, 47, 47a, 50 and 50a may be constructed of any suitable material either of flexible or non-flexible character. In actual practice, these plates have been ordinary composition boards formed from a suitable cellulosic base and hence are substantially non-flexible. It shall be understood, however, that my invention is not to be limited in this respect.

The arrangements of Fig. 5–10 inclusive operate in substantially the same manner as hereinbefore described in connection with Figs. 1–4 inclusive. As far as projection is concerned, the operation may be identical with that first described if desired.

An advantage of the arrangements of Figs. 5–

10 inclusive resides in the fact that the various screen structures Sl need not be provided with areas substantially transparent to sound waves. This is true because the passages for the sound waves are formed in the plates 25, 26, etc. As stated, these plates last named are substantially in the plane of the associated screen structure Sl and, in so far as sound reproduction is concerned, are in effect a part thereof. That is, the side plates, together with the top and bottom plates when used, and the associated screen structure function more or less as a composite baffle, it is believed, to insure sound reproduction of the desired volume and to render the same substantially non-directional in character. Obviously, if desired, the arrangements of Figs. 5–10 inclusive may have lateral members associated therewith the same as the hereinbefore described members 12 or their equivalent.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a system of the character described, a screen structure including a flexible member comprising a composition of matter resistant to passage of sound waves therethrough and with which a light beam is adapted to coact throughout a central area thereof for the display of images, a rectangular vertical frame, means for holding said member under tension on the frame, said screen structure, at different sides of said central display area, being provided with openings readily transparent to sound waves, magnetic loud speaker reproducing units at the rear of said screen structure for passing sound waves through the openings, said reproducing units having their forward ends arranged substantially in the plane of the screen structure, means for supporting said reproducing units independently of said screen structure, and resilient vibration and sound deadening means forming a closed connection between the forward end of the speaker units and the surface of the screen structure.

2. In a system of the character described, a screen structure comprising a flexible member of a composition of matter resistant to passage of sound waves therethrough and with which a light beam is adapted to coact throughout a central area thereof for the display of images, said member being provided with openings readily transparent to sound at opposite sides of said central display area, a rectangular vertical frame, means for holding said member under tension on the frame, magnetic cone type loud speaker units mounted on the frame and disposed substantially in the plane of the flexible member, and a flexible sound and vibration deadening connection between the loud speakers and the surface of the member adjacent the edges of the sound transparent openings in the member, whereby the screen structure functions as a baffle for the electro magnetic speakers without undue vibration of the image display member.

3. In a system of the character described, a screen structure including a flexible member comprising a composition of matter resistant to passage of sound waves therethrough and with which a light beam is adapted to coact throughout a central area thereof for the display of images, a rectangular vertical frame, means for holding said member under tension on the frame, said screen structure, at different sides of said central display area, being provided with openings readily transparent to sound waves, magnetic loud speaker reproducing units at the rear of said screen structure for passing sound wave beams through the respective openings, said reproducing units having their forward ends disposed closely adjacent said screen structure and the diaphragms thereof being adapted to vibrate independently of said screen structure, and means for supporting said reproducing units independently of said screen structure.

4. In a system of the character described, a screen structure comprising a flexible member of a composition of matter resistant to passage of sound waves therethrough and with which a light beam is adapted to coact throughout a central area thereof for the display of images, a rectangular vertical frame, means for holding said flexible member to said frame under tension, said flexible member being provided with an opening disposed between said display area and said holding means, a magnetic loud speaker reproducing unit at the rear of said screen structure for passing a sound wave beam through said opening, said reproducing unit having its forward end disposed closely adjacent said screen structure and the diaphragm thereof being adapted to vibrate independently of said screen structure, and means for supporting said reproducing unit independently of said screen structure.

5. In a system of the character described, a screen structure comprising a flexible member of a composition of matter resistant to passage of sound waves therethrough and with which a light beam is adapted to coact throughout a central area thereof for the display of images, a rectangular vertical frame, means for holding said flexible member to said frame under tension, said flexible member, at different respective sides thereof, being provided with openings disposed between said display area and said holding means, fabric sections adhesively secured to said flexible member for covering said openings, magnetic loud speaker reproducing units at the rear of said screen structure for passing sound wave beams through the respective openings, said reproducing units having their forward ends disposed closely adjacent said screen structure and the diaphragms thereof being adapted to vibrate independently of said screen structure, and means for supporting said reproducing units independently of said screen structure.

DAVID F. NEWMAN.